(12) United States Patent
Hall

(10) Patent No.: US 11,884,275 B2
(45) Date of Patent: Jan. 30, 2024

(54) METHOD FOR CONTROLLING A VEHICLE IN ASSOCIATION WITH A DESCENT, A POWERTRAIN, A VEHICLE, A COMPUTER PROGRAM AND A COMPUTER-READABLE MEDIUM

(71) Applicant: Scania CV AB, Södertälje (SE)

(72) Inventor: Ola Hall, Stockholm (SE)

(73) Assignee: Scania CV AB, Södertälje (SE)

( * ) Notice: Subject to any disclaimer, the term of this patent is extended or adjusted under 35 U.S.C. 154(b) by 354 days.

(21) Appl. No.: 17/427,415

(22) PCT Filed: Feb. 12, 2020

(86) PCT No.: PCT/SE2020/050146
§ 371 (c)(1),
(2) Date: Jul. 30, 2021

(87) PCT Pub. No.: WO2020/185138
PCT Pub. Date: Sep. 17, 2020

(65) Prior Publication Data
US 2022/0097705 A1    Mar. 31, 2022

(30) Foreign Application Priority Data

Mar. 8, 2019  (SE) .................................. 1950294-7

(51) Int. Cl.
*B60W 30/18*  (2012.01)
*B60W 10/08*  (2006.01)
(Continued)

(52) U.S. Cl.
CPC ....... *B60W 30/18109* (2013.01); *B60T 8/245* (2013.01); *B60W 10/08* (2013.01);
(Continued)

(58) Field of Classification Search
None
See application file for complete search history.

(56) References Cited

U.S. PATENT DOCUMENTS

2006/0213463 A1  9/2006  Wikstrom
2010/0273079 A1* 10/2010  Hinsenkamp ..... H01M 8/04029
                                                       429/442

(Continued)

FOREIGN PATENT DOCUMENTS

CN    105508020 A    4/2016
DE     19641558 A1    4/1998
(Continued)

OTHER PUBLICATIONS

Scania CV AB, European Patent Application No. 20771036.9, Extended European Search Report, dated Oct. 17, 2022.
(Continued)

*Primary Examiner* — Todd Melton
*Assistant Examiner* — Jason R Roberson
(74) *Attorney, Agent, or Firm* — Moore & Van Allen PLLC; W. Kevin Ransom

(57) ABSTRACT

The present invention relates to a method for controlling a vehicle in association with a descent, the vehicle having a powertrain comprising: a drive unit configured to provide propulsion power; an auxiliary brake device; and a first cooling circuit comprising a first coolant; wherein the drive unit and the auxiliary brake device are arranged to be selectively connected or disconnected with/from the first cooling circuit, wherein the drive unit has a first maximum temperature and the auxiliary brake device has a second maximum temperature higher than the first maximum temperature, the method comprising: controlling the drive unit to reduce the provided propulsion power when the vehicle is approaching an upcoming descent, which fulfils predetermined criteria; disconnecting the drive unit from the first cooling circuit; connecting the auxiliary brake device with the first cooling circuit; and controlling the auxiliary brake device to brake to vehicle down the descent.

16 Claims, 5 Drawing Sheets

(51) Int. Cl.
  *B60W 10/18* (2012.01)
  *B60T 8/24* (2006.01)
  *B60K 11/00* (2006.01)
  *F16D 65/78* (2006.01)

(52) U.S. Cl.
  CPC .............. *B60W 10/18* (2013.01); *B60K 11/00* (2013.01); *B60T 2201/04* (2013.01); *B60T 2210/20* (2013.01); *B60W 2552/15* (2020.02); *B60W 2710/18* (2013.01); *F16D 2065/783* (2013.01)

(56) References Cited

U.S. PATENT DOCUMENTS

| | | |
|---|---|---|
| 2012/0209486 A1 | 8/2012 | Stander et al. |
| 2015/0183337 A1 | 7/2015 | Na et al. |
| 2016/0061093 A1 | 3/2016 | Johansson et al. |
| 2016/0141645 A1 | 5/2016 | Yamada et al. |
| 2017/0037777 A1* | 2/2017 | Bellinger .................. F01P 3/20 |
| 2017/0166083 A1 | 6/2017 | Kim et al. |

FOREIGN PATENT DOCUMENTS

| | | |
|---|---|---|
| DE | 102006036186 A1 | 10/2007 |
| DE | 102012205141 A1 | 10/2013 |
| WO | 2008091193 A1 | 7/2008 |
| WO | 2018013028 A1 | 1/2018 |

OTHER PUBLICATIONS

Scania CV AB, International Patent Application No. PCT/SE2020/050146, International Preliminary Report on Patentability, dated Aug. 25, 2021.
Scania CV AB, International Patent Application No. PCT/SE2020/050146, International Search Report, dated Apr. 24, 2020.
Scania CV AB, International Patent Application No. PCT/SE2020/050146, Written Opinion, dated Apr. 24, 2020.

* cited by examiner

METHOD FOR CONTROLLING A VEHICLE IN ASSOCIATION WITH A DESCENT, A POWERTRAIN, A VEHICLE, A COMPUTER PROGRAM AND A COMPUTER-READABLE MEDIUM

CROSS-REFERENCE TO RELATED APPLICATIONS

This application is a National Stage Patent Application (filed under 35 § U.S.C. 371) of PCT/SE2020/050146, filed Feb. 12, 2020 of the same title, which, in turn claims priority to Swedish Patent Application No. 1950294-7 filed Mar. 8, 2019 of the same title; the contents of each of which are hereby incorporated by reference.

FIELD OF THE INVENTION

The invention relates to a method for controlling a vehicle in association with a descent. The invention also relates to a powertrain and a vehicle comprising such a powertrain. The invention also relates to a computer program and a computer-readable medium for carrying out the method.

BACKGROUND OF THE INVENTION

Vehicles with other drive units than internal combustion engines are becoming more and more common. Hybrid vehicles comprising an internal combustion engine and an electrical machine/motor have been known for a while but companies are constantly looking for other solutions to reduce the impact on the environment. Such other solution may be fuel cell arrangements.

Cooling of a fuel cell is crucial and the maximum temperature for a fuel cell is relatively low. This means that the coolant cooling the fuel call must have a relatively low temperature. An auxiliary brake in a fuel cell vehicle may have a higher maximum temperature than the fuel cell. An auxiliary brake is commonly known as a brake different from a main braking system (wheel brakes). An auxiliary brake in a fuel cell vehicle may be a retarder, a brake resistor, an air compression brake or any other auxiliary brake system. To maximize the performance of the auxiliary brake, the coolant should have a temperature as close as possible to the maximum temperature of the auxiliary brake. Separate cooling circuits is thereby required for the fuel cell and the auxiliary brake. Separate cooling circuits may be required for any vehicle having a drive unit with a lower maximum temperature than an auxiliary brake.

Document US2010273079 A1 discloses a fuel cell drive for a motor vehicle and a fuel cell cooling assembly comprising several cooling units for cooling different fuel cell units.

SUMMARY OF THE INVENTION

An object of the present invention is to achieve a new and advantageous method for controlling a vehicle in association with a descent, where the vehicle has a drive unit with a lower maximum temperature than an auxiliary brake. Another object of the present invention is to achieve a new and advantageous method for controlling a vehicle in association with a descent, which increases the performance of an auxiliary brake when required. Another object of the invention is to achieve a new and advantageous powertrain, vehicle, computer program and computer-readable medium.

The herein mentioned objects are achieved by a method, a powertrain, a vehicle, a computer program, and a computer-readable medium according to the independent claims.

Hence, according to an aspect of the present invention, a method, performed by a control device, for controlling a vehicle in association with a descent is provided. The vehicle has a powertrain comprising: a drive unit configured to provide propulsion power; an auxiliary brake device; and a first cooling circuit comprising a first coolant; wherein the drive unit and the auxiliary brake device are arranged to be selectively connected or disconnected with/from the first cooling circuit, wherein the drive unit has a first maximum temperature and the auxiliary brake device has a second maximum temperature higher than the first maximum temperature. The method comprises: controlling the drive unit to reduce the provided propulsion power when the vehicle is approaching an upcoming descent, which fulfils predetermined criteria; disconnecting the drive unit from the first cooling circuit; connecting the auxiliary brake device with the first cooling circuit; and controlling the auxiliary brake device to brake to vehicle down the descent.

According to another aspect of the invention, a powertrain for a vehicle is provided. The powertrain comprises: a drive unit configured to provide propulsion power; an auxiliary brake device; and a first cooling circuit comprising a first coolant; wherein the drive unit and the auxiliary brake device are arranged to be selectively connected or disconnected to the first cooling circuit, wherein the drive unit has a first maximum temperature) and the auxiliary brake device has a second maximum temperature higher than the first maximum temperature. The powertrain further comprises a control device configured to: control the drive unit to reduce the provided propulsion power when the vehicle is approaching an upcoming descent, which fulfils predetermined criteria; disconnect the drive unit from the first cooling circuit; connect the auxiliary brake device with the first cooling circuit; and control the auxiliary brake device to brake to vehicle down the descent.

According to another aspect of the invention, a vehicle is provided. The vehicle comprises a powertrain as disclosed herein.

A vehicle may comprise a plurality of cooling circuits for cooling various components in the vehicle. A drive unit, auxiliary brake or any other object of a vehicle has a maximum temperature, which means that the object should not have a temperature above the maximum temperature or the object may malfunction. Thus, the coolant cooling the object should have a temperature below the maximum temperature of the object in order to be able to cool the object and thereby maintain the maximum temperature. A vehicle having a drive unit and an auxiliary brake device with different maximum temperatures is restricted to the lowest maximum temperature in the case where the drive unit and the auxiliary brake device are connected to the same cooling circuit. Typically, heat rejection is dependent on the temperature difference between the coolant and the ambient air. With a higher temperature of the coolant, more heat will be rejected. According to the invention, the drive unit has a lower maximum temperature than the auxiliary brake device. This means that when the drive unit and the auxiliary brake device are connected to the first cooling circuit, the first coolant should not have a temperature higher than the first maximum temperature of the drive unit. However, this also means that the performance of the auxiliary brake device cannot be optimized since the auxiliary brake device only can be used to temperatures lower than its second maximum temperature. By configuring the powertrain according to the invention, such that the drive unit and the auxiliary brake device can be selectively connected to, or disconnected from, the first cooling circuit, the performance of the auxiliary brake device can be optimized despite the fact that the drive unit and the auxiliary brake device are connectable to the same cooling circuit. Thus, when the vehicle is approaching a certain descent, which fulfils predetermined criteria, the drive unit is controlled so that it provides a reduced amount of propulsion power. This way, the drive unit will require less cooling. The drive unit can thereby be disconnected from the first cooling circuit without the risk of overheating. It is then ensured that the auxiliary brake device is connected to the first cooling circuit and the auxiliary brake device is controlled to brake the vehicle down the descent. When the auxiliary brake device is activated, the auxiliary brake device requires cooling. Thus, the auxiliary brake device must first be connected to the first cooling circuit. By disconnecting the drive unit from the first cooling circuit, the first coolant is no longer restricted to the first maximum temperature of the drive unit, but can have a temperature similar to the second maximum temperature of the auxiliary brake device. The auxiliary brake device can thereby be operated to a higher temperature and the performance of the auxiliary brake device can be optimized.

Further objects, advantages and novel features of the present invention will become apparent to one skilled in the art from the following details, and also by putting the invention into practice. Whereas examples of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For better understanding of the present invention and further objects and advantages of it, the detailed description set out below should be read together with the accompanying drawings, in which the same reference notations denote similar items in the various diagrams, and in which.

DETAILED DESCRIPTION

Figure 1:
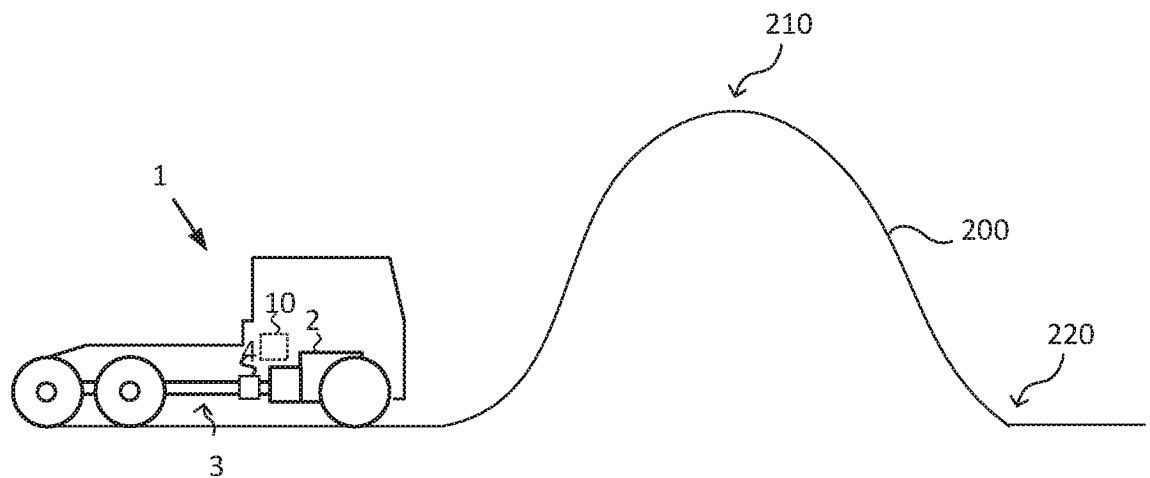
FIG. 1 schematically illustrates a side view of a vehicle according to an example.

Cooling of components in vehicles is crucial for their performance and durability. To ensure cooling of a drive unit and enable increase of the performance of an auxiliary brake, a method, a powertrain and a vehicle according to the disclosure has been developed.

Hence, according to an aspect of the present disclosure, a method, performed by a control device, for controlling a vehicle in association with a descent is provided. The vehicle has a powertrain comprising: a drive unit configured to provide propulsion power; an auxiliary brake device; and a first cooling circuit comprising a first coolant; wherein the drive unit and the auxiliary brake device are arranged to be selectively connected or disconnected with/from the first cooling circuit, wherein the drive unit has a first maximum temperature and the auxiliary brake device has a second maximum temperature higher than the first maximum temperature. The method comprises: controlling the drive unit to reduce the provided propulsion power when the vehicle is approaching an upcoming descent, which fulfils predetermined criteria; disconnecting the drive unit from the first cooling circuit; connecting the auxiliary brake device with the first cooling circuit; and controlling the auxiliary brake device to brake to vehicle down the descent.

The drive unit having a first maximum temperature means that the drive unit is configured to function properly up to a first maximum temperature. Similarly, the auxiliary brake device having a second maximum temperature means that the auxiliary brake device is configured to function properly up to a second maximum temperature. To maintain a temperature below the maximum temperature during operation of the drive unit and the auxiliary brake device respectively, the drive unit and the auxiliary brake device must be cooled by means of the first cooling circuit and the first coolant. Furthermore, the temperature of the first coolant should be below the maximum temperature of the drive unit and the auxiliary brake device respectively. The first maximum temperature of the drive unit may be between 70-80 degrees Celsius. The second maximum temperature of the auxiliary brake device may be between 100-120 degrees Celsius. Thus, if the drive unit and the auxiliary brake device are both connected with the first cooling circuit, the temperature of the first coolant is restricted by (should be below) the first maximum temperature of the drive unit, since this temperature is lower than the second maximum temperature of the auxiliary brake device. The auxiliary brake device will then not be able to operate optimally. When a vehicle is travelling downhill, auxiliary brakes may be required to brake the vehicle typically to reduce wear of wheel brakes. Depending on the descent, optimal performance of the auxiliary brake device may be required. Therefore, when the vehicle is approaching a descent fulfilling certain criteria, the drive unit is disconnected from the first cooling circuit, so that the temperature of the first coolant instead is restricted by the second maximum temperature of the auxiliary brake device and the performance of the auxiliary brake device can thereby be increased. It is to be understood that there may be a delay before disconnecting the drive unit from the first cooling circuit, in order to remove any residual heat remaining in the drive unit. Furthermore, in the event that the auxiliary brake has a maximum temperature, which is lower than the maximum temperature of the drive unit, a similar solution may be used where the auxiliary brake device is disconnected from the first cooling circuit to optimize the performance of the drive unit.

The first cooling circuit may comprise a first radiator and a first fan. The first radiator may be arranged in fluid communication with the drive unit and the auxiliary brake device. The same first radiator is thus arranged to cool both the drive unit and the auxiliary brake device. The first cooling circuit may further comprise a first pump arranged in fluid communication with the drive unit and/or a second pump arranged in fluid communication with the auxiliary brake device. The first cooling circuit may further comprise a reservoir accommodating the first coolant. The first cooling circuit may also comprise conduits/passages/pipes for the coolant to flow between the various components according to conventional cooling circuits. The drive unit and the auxiliary brake device being arranged to be selectively connected with, or disconnected from, the first cooling circuit means that the drive unit and the auxiliary brake device are arranged to be selectively connected with, or disconnected from, the first radiator. Thus, the drive unit and the auxiliary brake device are arranged to be cooled by means of the first cooling circuit, but are arranged to be selectively connected with, or disconnected from, the first radiator.

The drive unit may comprise a fuel cell arrangement or an electrical machine. The auxiliary brake device is a brake device in addition to a main braking system of the vehicle. The main braking system may comprise conventional wheel brakes. The auxiliary brake device may comprise a retarder, a brake resistor, an air compression brake or any other auxiliary brake system.

Controlling the drive unit to reduce the provided propulsion power when the vehicle is approaching an upcoming descent, which fulfils predetermined criteria, may comprise reducing the provided propulsion power to essentially zero. Thus, the drive unit may be deactivated. By reducing the work of the drive unit, the drive unit requires less cooling. Today, vehicles typically comprises different systems for reducing costs, reducing fuel consumption, improving driving performance etc. One common strategy is to reduce the vehicle speed before reaching a top of a descent and let the vehicle regain speed when going downhill and thereby converting potential energy to kinetic energy. Thus, reducing the propulsion power provided by means of the drive unit may be performed at a certain distance before reaching the top of the descent.

The method may comprise identifying an upcoming descent, which fulfils the predetermined criteria. The control device may collect data relating to the surroundings and upcoming descents from various vehicle sensors, vehicle systems, navigation systems and map data. The control device may further identify an upcoming descent, which fulfils the predetermined criteria based on this collected data. According to an example, the predetermined criteria comprises that the upcoming descent has a certain length and/or a certain gradient. When the descent has a certain length and/or gradient the vehicle may have to be braked in order to avoid acceleration of the vehicle. However, the acceleration also depends on the vehicle weight. The predetermined criteria relating to the descent may thus depend on the vehicle weight. Typically, the higher the decent is or the larger the gradient of the descent is, the more likely is it the auxiliary brake device will be required to brake the vehicle down the descent. The predetermined criteria may thus comprise that the height of the descent is above a predetermined threshold and/or that the gradient of the descent is larger than a predetermined threshold. The predetermined criteria may be stored in the control device. The current vehicle weight may also be stored in the control device. The control device may comprise a list of predetermined criteria associated with different vehicle weights, saved in a database. The control device may thus compare the collected data relating to the descent with the list to determine if the criteria are fulfilled. When travelling downhill the vehicle is typically operated to maintain a desired vehicle speed or to avoid a runaway condition. Braking the vehicle can be performed by using the main braking system of the vehicle and/or by using the auxiliary brake device. When the auxiliary brake device is used, it needs cooling and to be able to optimize the performance of the auxiliary brake device, the drive unit may be disconnected from the first cooling circuit. The predetermined criteria may thus be that the descent is configured, such that the auxiliary brake device is required to brake the vehicle down the descent, to avoid runaway behaviour or maintain a desired vehicle speed. Thus, the method steps may only be performed when the vehicle is approaching a descent where the auxiliary brake device is required to brake the vehicle.

According to an example of the present disclosure, disconnecting the drive unit from the first cooling circuit comprises controlling a first valve arrangement. The first cooling circuit may thus comprise a first valve arrangement arranged in fluid communication with the drive unit. The first valve arrangement may be controlled to different states and thereby disconnect or connect the drive unit with/from the first cooling circuit/the first radiator. When the drive unit is connected with the first cooling circuit, the coolant is allowed to flow through the drive unit, via the first valve arrangement on to the first radiator and back to the drive unit. Thus, first coolant leaving the drive unit is directed by means of the first valve arrangement to the first radiator when the drive unit is connected to the first cooling circuit, and then back to the drive unit. This may be referred to as the drive unit circuit. The powertrain may further comprise a bypass circuit. The bypass circuit may be arranged in fluid communication with the first valve arrangement and the drive unit, so that the first coolant can be selectively directed to the bypass circuit instead of to the first radiator of the first cooling circuit. Thus, when the first valve arrangement is controlled to disconnect the drive unit from the first cooling circuit, the first coolant is allowed to flow through the drive unit, via the first valve arrangement to the bypass circuit and back to the drive unit. Disconnecting the drive unit from the first cooling circuit thus comprises controlling the first valve arrangement to let the first coolant bypass the first radiator.

The method may comprise ensuring that the auxiliary brake device is connected with the first cooling circuit. When the method is initiated, both the drive unit and the auxiliary brake device may be connected with the first cooling circuit. Connecting the auxiliary brake device with the first cooling circuit may comprise controlling a second valve arrangement. The first cooling circuit may thus comprise a second valve arrangement arranged in fluid communication with the auxiliary brake device. The second valve arrangement may be controlled to different states and thereby disconnect or connect the auxiliary brake device with/from the first cooling circuit. When the auxiliary brake device is connected with the first cooling circuit, the first coolant is allowed to flow via the second valve arrangement through the auxiliary brake device, on to the first radiator and back to the auxiliary brake device. This may be referred to as the auxiliary brake circuit. When the second valve arrangement is controlled to disconnect the auxiliary brake device from the first cooling circuit, the first coolant is not allowed to flow through the auxiliary brake device.

Alternatively, connecting the auxiliary brake with the first cooling circuit may comprise activating the auxiliary brake device. Thus, the powertrain may be configured, so that the auxiliary brake device automatically is connected to the first cooling circuit when the auxiliary brake device is activated. Similarly, when the auxiliary brake device no longer is used, the auxiliary brake device may automatically be disconnected from the first cooling circuit. The auxiliary brake device being connected to the first cooling circuit may thus mean that the first coolant is allowed to flow through the auxiliary brake device.

The first cooling circuit may comprise/be divided into a drive unit circuit and an auxiliary brake circuit. The drive unit circuit may comprise the first pump and the auxiliary brake circuit may comprise the second pump. The first pump and the second pump are arranged to enable a flow of the coolant through the drive unit respectively the auxiliary brake.

According to an example, the method further comprises controlling the powertrain, so that propulsion power is provided by means of an energy storage unit of the powertrain before the vehicle has reached the top of the descent. It is to be understood that a vehicle comprising a fuel cell also comprises an electrical machine for propulsion of the vehicle. Vehicles comprising fuel cells often comprises an energy storage unit, such as a battery. Typically, in the event that the fuel cell generates too much energy the energy storage unit will store the excess energy and in the event that the fuel cell generates too little energy, the energy storage unit may provide energy to the electrical machine. As previously mentioned, it is common to reduce the vehicle speed before the top of a descent. However, in order to be able to disconnect the drive unit from the first cooling circuit in a safe way, the temperature of the drive unit may be substantially decreased before disconnecting the drive unit from the first cooling circuit. The drive unit may therefore be controlled to reduce the propulsive power at a distance from the top of the descent, sufficient to cool and disconnect the drive unit. However, the vehicle driver may not appreciate reducing the vehicle speed too much before reaching the top of the descent and therefore the energy storage unit may be used to provide energy to the electrical machine and thereby to provide propulsion power. This way, the vehicle speed is not affected by the reduce of propulsion power provided by the drive unit. Thus, the method may comprise controlling the energy supply to the electrical machine, so that the energy is provided by the energy storage unit instead of the drive unit. Energy may be provided by the energy storage unit automatically as a consequence of reducing the propulsion power provided by the drive unit. Thus, controlling the powertrain to provide propulsion power by means of an energy storage unit may be performed automatically by controlling the drive unit to reduce the provided propulsion power. However, depending on the configuration of the powertrain, active control of the powertrain may be required to provide propulsion power by means of the energy storage unit. Controlling the powertrain to provide propulsive power by means of the energy storage unit before the vehicle has reached the top of the descent may mean that the powertrain is controlled to provide propulsive power by means of the energy storage unit until the vehicle has reached the top of the descent, or at least for a period of time before the vehicle has reached the top of the descent. When the vehicle is operated down the descent, the energy storage unit may instead be charged by converting kinetic energy to electric energy.

Furthermore, the method may comprise connecting the drive unit with the first cooling circuit when the temperature of the first coolant is below the first maximum temperature of the drive unit. At the bottom of the descent, the power of the auxiliary brake device will be reduced and the temperature of the first coolant will quickly decrease. When the temperature of the first coolant is below the first maximum temperature of the drive unit the drive unit can be cooled by the first cooling circuit and maintain its first maximum temperature. Thus, it is safe to connect the drive unit with the first cooling circuit again. Connecting the drive unit with the first cooling circuit may comprise controlling the first valve arrangement, so that the first coolant flowing through the drive unit is allowed to flow through the first radiator.

The method may also comprise disconnecting the auxiliary brake device from the first cooling circuit, when the auxiliary brake device no longer is operating. Disconnecting the auxiliary brake device from the first cooling circuit may comprise controlling the second valve arrangement or it may comprise deactivating the auxiliary brake device, whereby it is automatically disconnected from the first cooling circuit.

According to an example, the method further comprises connecting an auxiliary cooling arrangement of the powertrain with the drive unit, when the drive unit is disconnected from the first cooling circuit. When the drive unit is disconnected from the first cooling circuit, it may still require some cooling to remove heat. The need for cooling will, however, be smaller since the drive unit is controlled to provide less propulsion power. By connecting the drive unit with an auxiliary cooling arrangement, required cooling of the drive unit can be obtained while cooling the auxiliary brake by means of the first cooling circuit.

The auxiliary cooling arrangement may comprise an auxiliary radiator arranged in fluid communication with the drive unit. The auxiliary radiator is suitably of smaller size and capacity than the first radiator of the first cooling circuit. The auxiliary cooling arrangement may also comprise an auxiliary fan arranged in association with the auxiliary radiator. The auxiliary radiator may be arranged in the bypass circuit or in any other convenient way. The auxiliary radiator may, for example, be arranged before the first valve arrangement. The auxiliary cooling arrangement may thereby be connected with the drive unit by controlling the first valve arrangement. Thus, by controlling the first valve arrangement, first coolant leaving the drive unit will be directed to the bypass circuit and flow through the auxiliary radiator to the drive unit. The first coolant in the bypass circuit will thereby be cooled by the auxiliary radiator and will cool the drive unit.

According to another example, the auxiliary cooling arrangement comprises a heat exchanger arranged in fluid communication with the drive unit and a second cooling circuit with a second cooling medium. The second cooling circuit is suitably colder than the first cooling circuit. Thus, the second cooling medium has a lower temperature than the first coolant in the first cooling circuit. The heat exchanger may be arranged in the bypass circuit or before the first valve arrangement. The second cooling circuit may be arranged to be in fluid communication with the heat exchanger by controlling a third valve arrangement. Thus, by controlling the third valve arrangement, the second cooling medium may be allowed to flow through the heat exchanger and thereby cool the first coolant in fluid communication with the heat exchanger. The second cooling circuit may be a cooling circuit for power electronics of the vehicle. Alternatively, the second cooling circuit may be a cooling circuit for motor oil or coolant, battery cooling or similar. It is to be understood that exactly how the second cooling circuit is configured or is connected with the heat exchanger is not essential for the function of the present disclosure as long as the second cooling medium selectively can flow through the heat exchanger and thereby cool the drive unit.

The auxiliary cooling arrangement may alternatively comprise a second cooling circuit with a second coolant, arranged to be in fluid communication with the drive unit by controlling a fourth valve arrangement, so that the first coolant is mixed with the second coolant. The auxiliary cooling arrangement may thereby be connected with the drive unit by controlling the fourth valve arrangement. The second cooling circuit may be arranged in fluid communication with the bypass circuit, upstream of the drive unit. When the fourth valve arrangement is controlled to an open stage, second coolant from the second cooling circuit will mix with the first coolant in the bypass circuit. The second coolant suitably has a lower temperature than the first coolant in the bypass circuit. Thus, the mixed coolant passing the drive unit will have a lower temperature and the drive unit will thereby be cooled. The second cooling circuit may be a cooling circuit for power electronics of the vehicle. Alternatively, the second cooling circuit may be a cooling circuit for a battery. The same amount of fluid entering the bypass circuit from the second cooling circuit should be removed/returned from the bypass circuit to the second cooling circuit. Thus, some of the mixed coolant may be returned to the second cooling circuit before entering the drive unit. Alternatively, mixed coolant downstream/after the drive unit may be returned to the second cooling circuit. It is to be understood that exactly how the second cooling circuit is configured or is connected with the drive unit/bypass circuit is not essential for the function of the present disclosure as long as the second coolant selectively can be mixed with the first coolant for cooling the drive unit.

According to another aspect of the present disclosure, a powertrain for a vehicle is provided. The powertrain comprises: a drive unit configured to provide propulsion power; an auxiliary brake device; and a first cooling circuit comprising a first coolant; wherein the drive unit and the auxiliary brake device are arranged to be selectively connected or disconnected to the first cooling circuit, wherein the drive unit has a first maximum temperature and the auxiliary brake device has a second maximum temperature higher than the first maximum temperature. The powertrain further comprises a control device configured to control the drive unit to reduce the provided propulsion power when the vehicle is approaching an upcoming descent, which fulfils predetermined criteria; disconnect the drive unit from the first cooling circuit; connect the auxiliary brake device with the first cooling circuit; and control the auxiliary brake device to brake to vehicle down the descent.

According to yet another aspect of the present disclosure, a control device configured for controlling a vehicle in association with a descent is provided. It will be appreciated that all the embodiments described for the method aspect of the disclosure performed by the control device are also applicable to the control device aspect and the powertrain aspect of the disclosure. That is, the control device may be configured to perform any one of the steps of the method according to the various examples described above.

Thus, the control device may be configured to disconnect the drive unit from the first cooling circuit by controlling a first valve arrangement. The control device may be configured to connect the auxiliary brake device with the first cooling circuit by controlling a second valve arrangement. The control device may be configured to control the powertrain to provide propulsion power by means of an energy storage unit of the powertrain before the vehicle has reached the top of the upcoming descent. Furthermore, the control device may be configured to connect the drive unit with the first cooling circuit when the temperature of the first coolant is below the maximum temperature of the drive unit. The control device may also be configured to connect the auxiliary cooling arrangement with the drive unit, when the drive unit is disconnected from the first cooling circuit.

It is to be understood that the control device performing the disclosed method may be implemented as a separate entity or distributed in two or more physical entities. The control device may comprise one or more control units and/or computers. The control device may thus be implemented or realized by the control device comprising a processor and a memory, the memory comprising instructions, which when executed by the processor causes the control device to perform the herein disclosed method steps. The control device is comprised in the vehicle.

According to another aspect of the present disclosure, a vehicle is provided. The vehicle comprises a powertrain, and thus a control device, as disclosed herein.

The present disclosure will now be further illustrated with reference to the appended figures.

FIG. 1 schematically illustrates a side view of a vehicle 1 approaching a descent 200 according to an example. The exemplified vehicle 1 may be a heavy vehicle in the shape of a truck, bus or similar. The vehicle 1 has a powertrain 3, comprising a drive unit 2, an auxiliary brake device 4, and a first cooling circuit 10 comprising a first coolant (not shown). The descent 200 has a top/start 210 and a bottom/end 220. The powertrain 3 is further described with regard to FIGS. 2-5.

Figure 2:
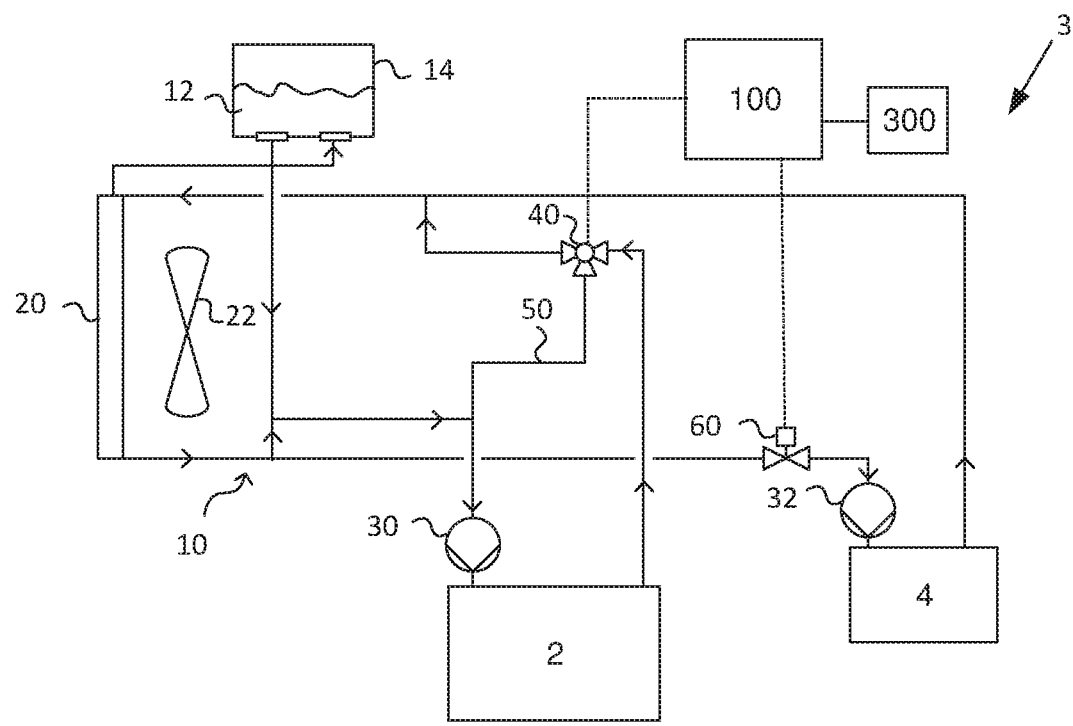
FIG. 2 schematically illustrates details of a powertrain of a vehicle according to an example.

FIG. 2 schematically illustrates details of a powertrain 3 for a vehicle according to an example. The powertrain 3 may be comprised in a vehicle 1 as disclosed in FIG. 1. As disclosed above, the powertrain 3 comprises a drive unit 2, an auxiliary brake device 4, and a first cooling circuit 10 comprising a first coolant 12. The direction of the flow of the first coolant 12 in the first cooling circuit 10 is illustrated by arrows in the figure. The drive unit 2 and the auxiliary brake device 4 are arranged to be selectively connected or disconnected with/from the first cooling circuit 10. The drive unit 2 has a first maximum temperature and the auxiliary brake device 4 has a second maximum temperature. The second maximum temperature may be higher than the first maximum temperature. The powertrain 3 also comprises a control device 100. The first cooling circuit 10 comprises a reservoir 14 for the first coolant 12.

The first cooling circuit 10 comprises a first radiator 20. The first cooling circuit 10 may also comprise a first fan 22 arranged in association with the first radiator 20. The first radiator 20 may be arranged in fluid communication with the drive unit 2 and the auxiliary brake device 4. The first cooling circuit 10 may further comprise a first pump 30 arranged in fluid communication with the drive unit 2 and/or a second pump 32 arranged in fluid communication with the auxiliary brake device 4.

The first cooling circuit 10 may comprise a first valve arrangement 40 arranged in fluid communication with the drive unit 2. The first valve arrangement 40 may be controllable to different states and thereby disconnect or connect the drive unit 2 with/from the first cooling circuit 10 and more specifically, the first radiator 20. The powertrain 3 may further comprise a bypass circuit 50. The bypass circuit 50 may be arranged in fluid communication with the first valve arrangement 40 and the drive unit 2, so that the first coolant 12 can be selectively directed to the bypass circuit 50 instead of to the first radiator 20 of the first cooling circuit 10. When the first valve arrangement 40 is controlled to disconnect the drive unit 2 from the first radiator 20, the first coolant 12 is allowed to flow through the drive unit 2, via the first valve arrangement 40 to the bypass circuit 50 and back to the drive unit 2. When the drive unit is disconnected from the first radiator 20, the first valve arrangement 40 is controlled to let the first coolant 12 bypass the first radiator 20. When the drive unit 2 is connected with the first radiator 20, the first coolant 12 is allowed to flow through the drive unit 2, via the first valve arrangement 40 on to the first radiator 20 and back to the drive unit 2.

The first cooling circuit 10 may also comprise a second valve arrangement 60 arranged in fluid communication with the auxiliary brake device 4. The second valve arrangement 60 is controllable to different states to disconnect or connect the auxiliary brake device 4 with/from the first radiator 20. The second valve arrangement 60 may comprise a non-return valve, check valve or similar. When the auxiliary brake device 4 is connected with the first radiator 20, the first coolant 12 is allowed to flow via the second valve arrangement 60 through the auxiliary brake device 4, on to the first radiator 20 and back to the auxiliary brake device 4. When the auxiliary brake device 4 is disconnected from the first radiator 20, the second valve arrangement 60 may prevent the first coolant 12 from flowing through the auxiliary brake device 4.

The powertrain 3 may further comprise an energy storage unit 300 configured to selectively provide energy/propulsive power. The energy storage unit 300 may comprise a battery.

The control device 100 of the powertrain 3 may be configured to control the drive unit 2 to reduce the provided propulsion power when the vehicle 1 is approaching an upcoming descent 200, which fulfils predetermined criteria. The control device 100 may also be configured to disconnect the drive unit 2 from the first cooling circuit 10, connect the auxiliary brake device 4 with the first cooling circuit 10, and control the auxiliary brake device 4 to brake the vehicle 1 down the descent 200.

The control device 100 may further be configured to identify an upcoming descent 200, which fulfils the predetermined criteria. The control device 100 may be configured to collect data relating to the descent 200 from various vehicle sensors (not shown), vehicle systems (not shown), navigation systems (not shown) and map data. The control device 100 may further be configured to identify an upcoming descent 200, which fulfils the predetermined criteria based on this collected data. According to an example, the predetermined criteria comprises that the upcoming descent 200 has a certain length and/or a certain gradient. The length of the descent 200 may be defined as the distance between the top of the descent 210 and the bottom of the descent 220. The predetermined criteria may be that the descent 200 is configured, such that the auxiliary brake device 4 is required to brake the vehicle 1 down the descent 200. The predetermined criteria may be stored in the control device 100. The vehicle weight may also be stored in the control device 100. The control device 100 may comprise a list of predetermined criteria associated with different vehicle weights, saved in a database. The control device 100 may thus be configured to compare the collected data relating to the descent 200 with the list to determine if the criteria are fulfilled. The control device 100 may be configured to ensure that the auxiliary brake device 4 is connected with the first cooling circuit 10.

The control device 100 may be configured to disconnect the drive unit 2 from the first cooling circuit 10/first radiator 20 by controlling the first valve arrangement 40. The control device 100 may be configured to connect the auxiliary brake device 4 with the first cooling circuit 10 by controlling the second valve arrangement 60. The control device 100 may be configured to control the powertrain 3 to provide propulsion energy by means of the energy storage unit 300 before the vehicle 1 has reached the top 210 of the upcoming descent 200. Furthermore, the control device 100 may be configured to connect the drive unit 2 with the first cooling circuit 10 when the temperature of the first coolant 12 is below the first maximum temperature of the drive unit 2.

Figure 3:
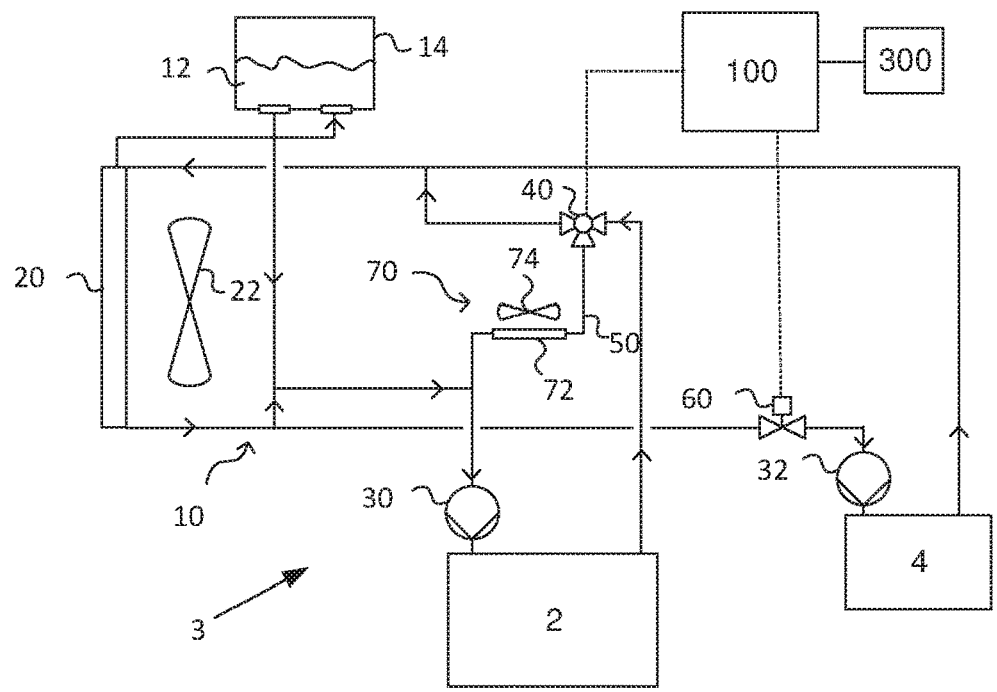
FIG. 3 schematically illustrates details of a powertrain of a vehicle according to an example.

FIG. 3 schematically illustrates details of a powertrain 3 for a vehicle according to an example. The powertrain 3 may be comprised in a vehicle 1 as disclosed in FIG. 1. The powertrain 3 may be configured as disclosed in FIG. 2.

In this example, the powertrain 3 further comprises an auxiliary cooling arrangement 70. The auxiliary cooling arrangement 70 may be arranged to selectively cool the drive unit 2, when the drive unit 2 is disconnected from the first cooling circuit 10. Thus, the control device 100 may be configured to connect the auxiliary cooling arrangement 70 with the drive unit 2, when the drive unit 2 is disconnected from the first cooling circuit 10. The auxiliary cooling arrangement 70 may comprise an auxiliary radiator 72 arranged in fluid communication with the drive unit 2. The auxiliary radiator 72 is suitably of smaller size and capacity than the first radiator 20 of the first cooling circuit 10. The auxiliary cooling arrangement 70 may also comprise an auxiliary fan 74 arranged in association with the auxiliary radiator 72. The auxiliary radiator 72 may be arranged in the bypass circuit 50. The auxiliary cooling arrangement 70 may thereby be connected with the drive unit 2 by controlling the first valve arrangement 40. Thus, by controlling the first valve arrangement 40, first coolant 12 leaving the drive unit 2 will be directed to the bypass circuit 50 and flow through the auxiliary radiator 72 to the drive unit 2. The first coolant 12 in the bypass circuit 50 will thereby be cooled by the auxiliary radiator 72 and will cool the drive unit 2.

Figure 4:
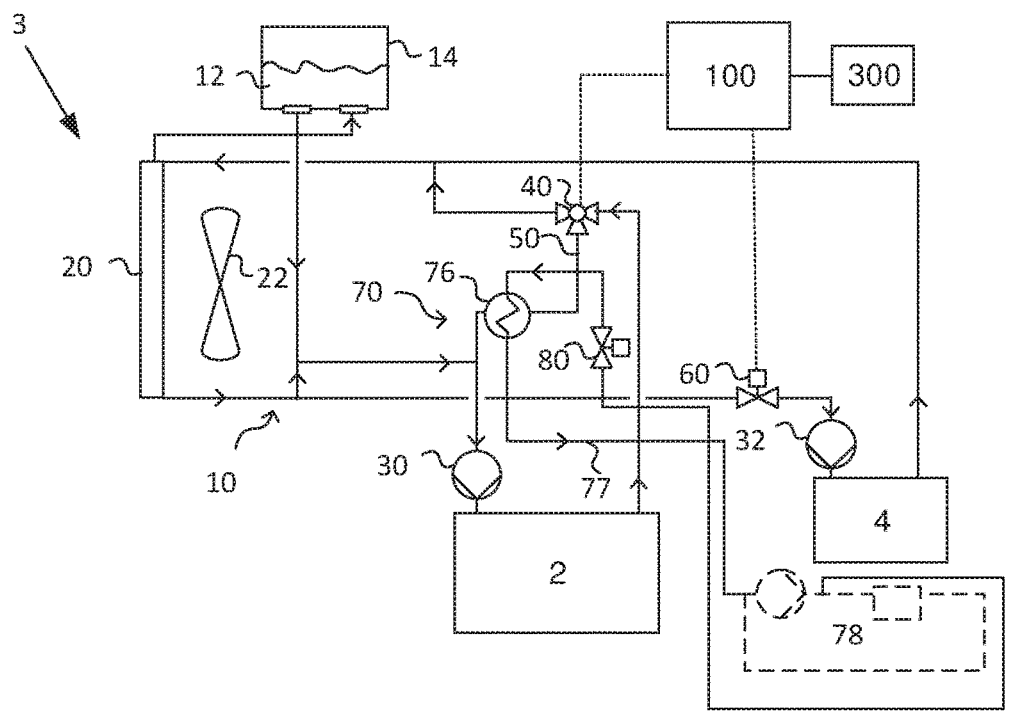
FIG. 4 schematically illustrates details of a powertrain of a vehicle according to an example.

FIG. 4 schematically illustrates details of a powertrain 3 for a vehicle according to an example. The powertrain 3 may be comprised in a vehicle 1 as disclosed in FIG. 1. The powertrain 3 may be configured as disclosed in FIG. 2.

In this example, the powertrain 3 further comprises an auxiliary cooling arrangement 70. The auxiliary cooling arrangement 70 may be arranged to selectively cool the drive unit 2, when the drive unit 2 is disconnected from the first cooling circuit 10. Thus, the control device 100 may be configured to connect the auxiliary cooling arrangement 70 with the drive unit 2, when the drive unit 2 is disconnected from the first cooling circuit 10. The auxiliary cooling arrangement 70 comprises a heat exchanger 76 arranged in fluid communication with the drive unit 2 and a second cooling circuit 78 with a second cooling medium 77. The second cooling circuit 78 is suitably colder than the first cooling circuit 10. Thus, the second cooling medium 77 has a lower temperature than the first coolant 12 in the first cooling circuit 10. The second cooling circuit 78 may comprise a pump and other components but is not part of the invention per se and is therefore illustrated with dashed lines. The heat exchanger 76 may be arranged in the bypass circuit. The second cooling circuit 78 may be arranged to be in fluid communication with the heat exchanger 76 by controlling a third valve arrangement 80. The auxiliary cooling arrangement 70 may thus comprise a third valve arrangement 80. By controlling the third valve arrangement 80, the second cooling medium 77 may be allowed to flow through the heat exchanger 76 and thereby cool the first coolant 12 in fluid communication with the heat exchanger 76. The first coolant 12 in the bypass circuit 50 will thereby be cooled by the second cooling circuit 78, and will cool the drive unit 2. The second cooling circuit 78 may be a cooling circuit for power electronics of the vehicle 1.

Figure 5:
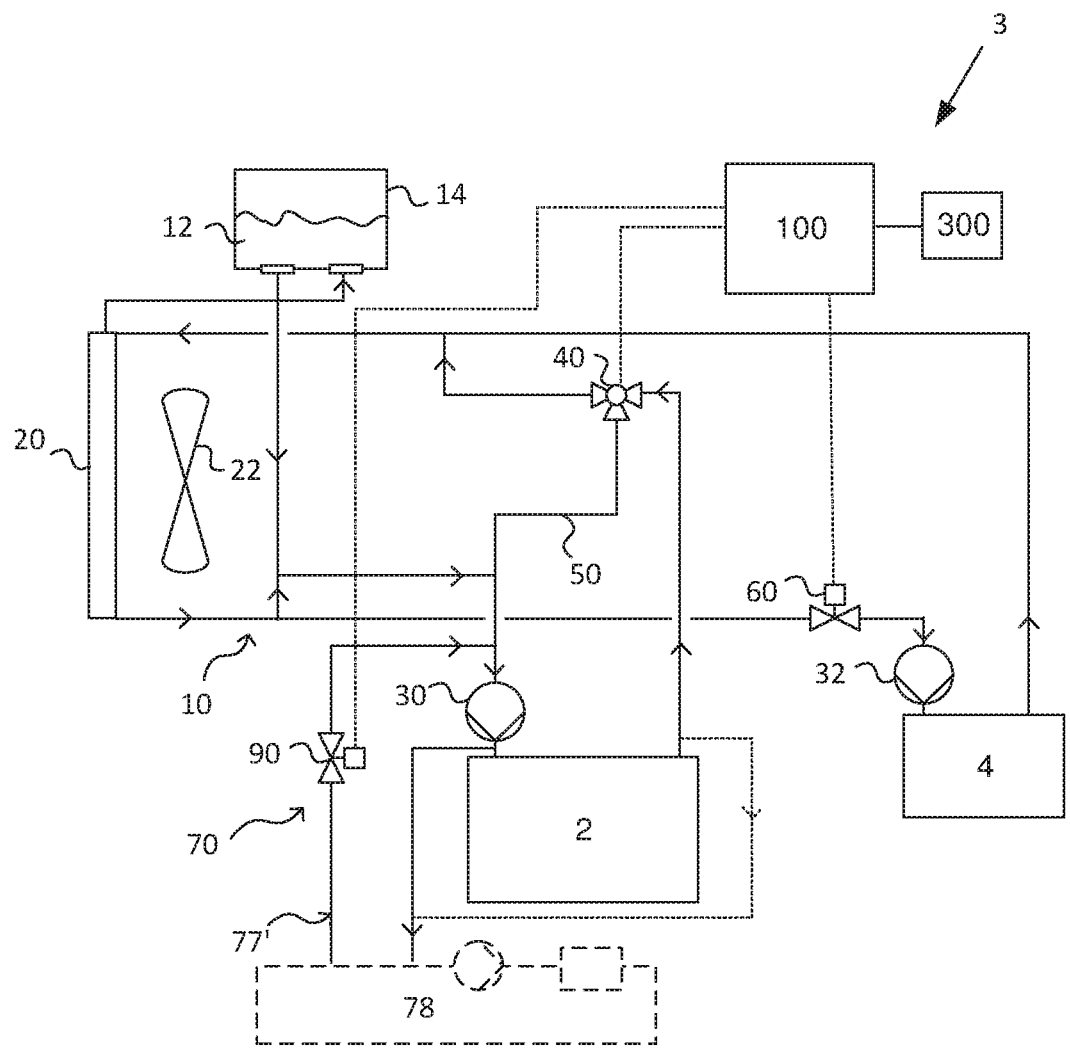
FIG. 5 schematically illustrates details of a powertrain of a vehicle according to an example.

FIG. 5 schematically illustrates details of a powertrain 3 for a vehicle according to an example. The powertrain 3 may be comprised in a vehicle 1 as disclosed in FIG. 1. The powertrain 3 may be configured as disclosed in FIG. 2.

In this example, the powertrain 3 further comprises an auxiliary cooling arrangement 70. The auxiliary cooling arrangement 70 may be arranged to selectively cool the drive unit 2, when the drive unit 2 is disconnected from the first cooling circuit 10. Thus, the control device 100 may be configured to connect the auxiliary cooling arrangement 70 with the drive unit 2, when the drive unit 2 is disconnected from the first cooling circuit 10. The auxiliary cooling arrangement 70 comprises a second cooling circuit 78 with a second coolant 77', arranged to be in fluid communication with the drive unit 2 by controlling a fourth valve arrangement 90, so that the first coolant 12 is mixed with the second coolant 77'. The auxiliary cooling arrangement 70 may thereby be connected with the drive unit 2 by controlling the fourth valve arrangement 80. The second cooling circuit 78 may be arranged in fluid communication with the bypass circuit 50, upstream of the drive unit 2. When the fourth valve arrangement 80 is controlled to an open stage, second coolant 77' from the second cooling circuit 78 will mix with the first coolant 12 in the bypass circuit 50. The second coolant 77' suitably has a lower temperature than the first coolant 12 in the bypass circuit 50. Thus, the mixed coolant entering the drive unit 2 will have a lower temperature and the drive unit 2 will thereby be cooled. The second cooling circuit 78 may be a cooling circuit for power electronics of the vehicle 1. The second cooling circuit 78 may comprise a pump and other components but is not part of the invention per se and is therefore illustrated with dashed lines. Some of the mixed coolant may be returned to the second cooling circuit 78 before entering the drive unit 2. Alternatively, some of the mixed coolant is returned to the second cooling circuit 78 after leaving the drive unit 2. This example is illustrated with dotted lines in the figure.

Figure 6:
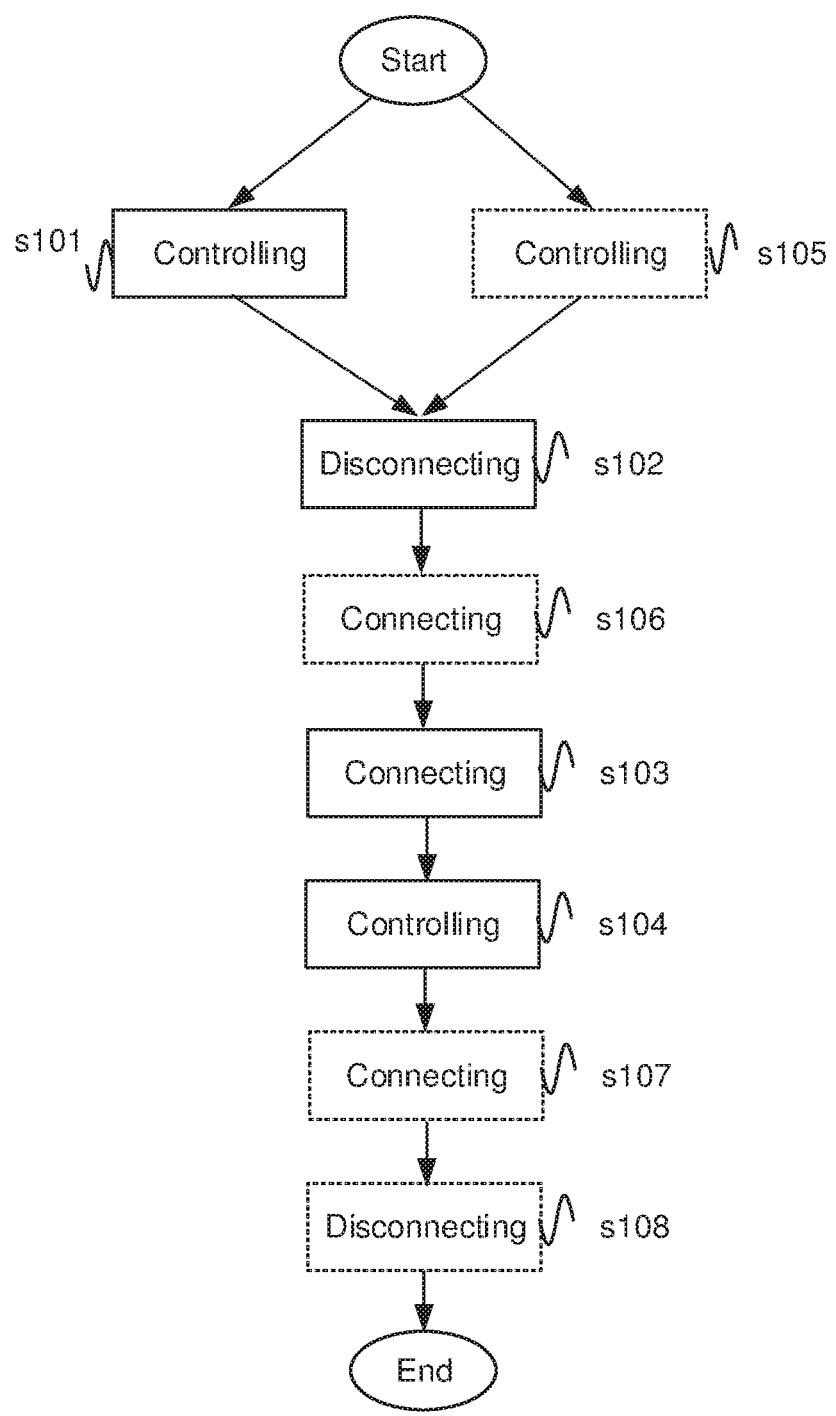
FIG. 6 schematically illustrates a block diagram of a method for controlling a vehicle in association with an upcoming descent according to an example.

FIG. 6 schematically illustrates a block diagram of a method for controlling a vehicle in association with a descent according to an example. The method relates to a vehicle as disclosed in FIG. 1 and a powertrain as disclosed in FIG. 2, 3, 4 or 5. The method is performed by a control device 100 as disclosed in FIG. 2-5.

The method comprises controlling s101 the drive unit 2 to reduce the provided propulsion power when the vehicle 1 is approaching an upcoming descent 200, which fulfils predetermined criteria; disconnecting s102 the drive unit 2 from the first cooling circuit 10; connecting s103 the auxiliary brake device 4 with the first cooling circuit 10; and controlling s104 the auxiliary brake device 4 to brake the vehicle 1 down the descent 200.

The step of controlling s101 the drive unit 2 to reduce the provided propulsion power when the vehicle 1 is approaching an upcoming descent 200 may comprise reducing the provided propulsion power to essentially zero.

The method may comprise identifying an upcoming descent 200, which fulfils the predetermined criteria. The step of controlling s101 the drive unit 2 to reduce the provided propulsion power may comprise to first identify an upcoming descent 200, which fulfils the predetermined criteria. The control device 100 may collect data relating to the descent 200 from various vehicle sensors, vehicle systems and map data. The control device 100 may further identify an upcoming descent 200, which fulfils the predetermined criteria based on this collected data. The predetermined criteria may comprise that the upcoming descent 200 has a certain length and/or a certain gradient. When the descent 200 has a certain length and/or gradient the vehicle 1 may have to be braked in order to avoid acceleration of the vehicle 1. The acceleration also depends on the vehicle weight. The predetermined criteria relating to the descent 200 may thus depend on the vehicle weight. The control device 100 may comprise a list of predetermined criteria associated with different vehicle weights, saved in a database. The method may thus comprise comparing the collected data relating to the descent 200 with the list to determine if the criteria are fulfilled. The predetermined criteria may be that the descent 200 is configured, such that the auxiliary brake device 4 is required to brake the vehicle 1 down the descent, to avoid runaway behaviour or maintain a desired vehicle speed. Thus, the method steps mentioned above may only be performed when the vehicle 1 is approaching a descent 200 where the auxiliary brake device 4 is required to brake the vehicle 1.

The step of disconnecting s102 the drive unit 2 from the first cooling circuit 10 may comprise controlling the first valve arrangement 40. Disconnecting s102 the drive unit 2 from the first cooling circuit 10 may comprise controlling the first valve arrangement 40 to let the first coolant 12 bypass the first radiator 20.

The step of connecting s103 the auxiliary brake device 4 with the first cooling circuit 10 may comprise controlling a second valve arrangement 60. Alternatively, connecting s103 the auxiliary brake device 4 with the first cooling circuit 10 may comprise activating the auxiliary brake device 4. Thus, the powertrain 3 may be configured, so that the auxiliary brake device 4 automatically is connected to the first cooling circuit 10 when the auxiliary brake device 4 is activated. It is to be understood that there may be situations where the auxiliary brake device 4 already is connected to the first cooling circuit 10 when the vehicle 1 is approaching the descent 200. In this case, the method may instead comprise ensuring that the auxiliary brake device 4 is connected with the first cooling circuit 10.

The method may further comprise controlling s105 the powertrain 3 so that propulsive power is provided by means of an energy storage unit 300 of the powertrain 3 before the vehicle 1 has reached the top 210 of the descent 200. This way, the drive unit 2 is not required to propel the vehicle 1. The step of controlling s105 the powertrain 3, so that propulsion power is provided by means of an energy storage unit 300 may be performed just before, just after or essentially simultaneously as the step of controlling s101 the drive unit 2 to reduce the provided propulsion power.

The method may also comprise connecting s106 an auxiliary cooling arrangement 70 of the powertrain 3 with the drive unit 2, when the drive unit 2 has been disconnected s102 from the first cooling circuit 10. Connecting s106 the auxiliary cooling arrangement 70 may comprise controlling the first valve arrangement 40 and/or a third valve arrangement 80 and/or a fourth valve arrangement 90, depending on the configuration of the auxiliary cooling arrangement 70 (se FIGS. 3-5). Connecting s106 the auxiliary cooling arrangement 70 with the drive unit 2 may be automatically performed when disconnecting s102 the drive unit 2 from the first cooling circuit 10, in the event that the auxiliary cooling arrangement 70 is arranged in association with the bypass circuit 50.

Furthermore, the method may comprise connecting s107 the drive unit 2 with the first cooling circuit 10 when the temperature of the first coolant 12 is below the first maximum temperature of the drive unit 2. Connecting s107 the drive unit 2 with the first cooling circuit 10 may comprise controlling the first valve arrangement 40, so that the first coolant 12 flowing through the drive unit 2 is allowed to flow through the first radiator 20.

The method may also comprise disconnecting s108 the auxiliary brake device 4 from the first cooling circuit 10, when the auxiliary brake device 4 no longer is operating. Disconnecting s108 the auxiliary brake device 4 from the first cooling circuit 10 may comprise controlling the second valve arrangement 60 or it may comprise deactivating the auxiliary brake device 4, whereby it is automatically disconnected from the first cooling circuit 10.

Figure 7:
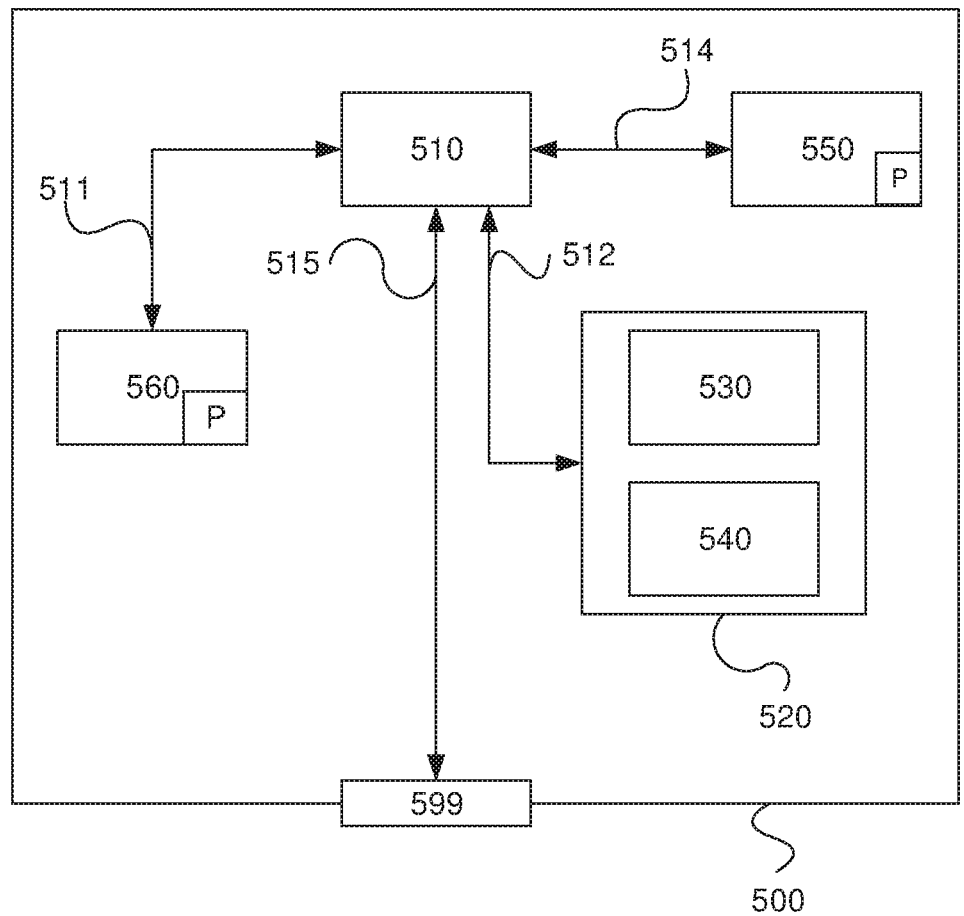
FIG. 7 schematically illustrates a control device or computer according to an example.

FIG. 7 is a diagram of a version of a device 500. The control device 100 described with reference to FIGS. 2-5 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for controlling a vehicle in association with a descent. The computer programme P further comprises routines for controlling the drive unit to reduce provided propulsion power when the vehicle is approaching an upcoming descent, which fulfils predetermined criteria; disconnecting the drive unit from the first cooling circuit; connecting the auxiliary brake device with the first cooling circuit; and controlling the auxiliary brake device to brake the vehicle down the descent. The computer programme P may also comprise routines for controlling the powertrain to provide propulsion power by means of an energy storage unit of the powertrain before the vehicle has reached the top of the descent. The computer programme P may also comprise routines for connecting the drive unit with the first cooling circuit when the temperature of the first coolant is below the first maximum temperature of the drive unit. The computer programme P may also comprise routines for connecting an auxiliary cooling arrangement with the drive unit, when the drive unit is disconnected from the first cooling circuit. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510, which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a control device, for controlling a vehicle in association with a descent, the vehicle having a powertrain comprising:
   a drive unit configured to provide propulsion power;
   an auxiliary brake device; and
   a first cooling circuit comprising a first coolant,
   wherein the drive unit and the auxiliary brake device are arranged to be selectively connected or disconnected with/from the first cooling circuit, wherein the drive unit has a first maximum temperature and the auxiliary brake device has a second maximum temperature higher than the first maximum temperature,
   the method comprising:
   identifying an upcoming descent, which fulfils predetermined criteria and controlling the drive unit to reduce the provided propulsion power when the vehicle is approaching the upcoming descent;
   disconnecting the drive unit from the first cooling circuit;
   connecting the auxiliary brake device with the first cooling circuit; and
   controlling the auxiliary brake device to brake the vehicle down the descent.

2. The method according to claim 1, wherein the predetermined criteria comprises that the upcoming descent has a certain length and/or a certain gradient.

3. The method according to claim 1, wherein disconnecting the drive unit from the first cooling circuit comprises controlling a first valve arrangement.

4. The method according to claim 1, wherein connecting the auxiliary brake device with the first cooling circuit comprises controlling a second valve arrangement.

5. The method according to claim 1, further comprising:
   controlling the powertrain to provide propulsive power by means of an energy storage unit of the powertrain, before the vehicle has reached a top of the upcoming descent.

6. The method according to claim 1, further comprising:
   connecting the drive unit with the first cooling circuit when a temperature of the first coolant is below the first maximum temperature of the drive unit.

7. The method according to claim 1, further comprising:
   connecting an auxiliary cooling arrangement of the powertrain with the drive unit, when the drive unit is disconnected from the first cooling circuit.

8. A powertrain for a vehicle, the powertrain comprising:
   a drive unit configured to provide propulsion power;
   an auxiliary brake device; and
   a first cooling circuit comprising a first coolant;
   wherein the drive unit and the auxiliary brake device are arranged to be selectively connected or disconnected to the first cooling circuit, wherein the drive unit has a first maximum temperature and the auxiliary brake device has a second maximum temperature higher than the first maximum temperature, the powertrain further comprising a control device configured to:

control the drive unit to reduce the provided propulsion power when the vehicle is approaching an upcoming descent, which fulfils predetermined criteria;

disconnect the drive unit from the first cooling circuit;

connect the auxiliary brake device with the first cooling circuit; and control the auxiliary brake device to brake the vehicle down the descent.

9. The powertrain according to claim 8, further comprising:

an energy storage unit, wherein the control device is configured to control the energy storage unit to provide propulsive power before the vehicle has reached the top of the upcoming descent.

10. The powertrain according to claim 8, wherein the control device is configured to connect the drive unit with the first cooling circuit when a temperature of the first coolant is below the first maximum temperature of the drive unit.

11. The powertrain according to any claim 8, further comprising:

an auxiliary cooling arrangement, wherein the control device is configured to connect the auxiliary cooling arrangement with the drive unit, when the drive unit is disconnected from the first cooling circuit.

12. The powertrain according to claim 11, wherein the auxiliary cooling arrangement comprises an auxiliary radiator arranged in fluid communication with the drive unit.

13. The powertrain according to claim 11, wherein the auxiliary cooling arrangement comprises a heat exchanger arranged in fluid communication with the drive unit and a second cooling circuit with a second cooling medium.

14. The powertrain according to claim 8, wherein the drive unit comprises a fuel cell.

15. The powertrain according to claim 8, wherein the auxiliary brake device comprises a retarder.

16. A vehicle comprising a powertrain according to claim 8.

* * * * *